Jan. 22, 1957  D. L. LAUER  2,778,531
CONDUIT FLOW CONTROL SYSTEM
Filed Feb. 12, 1953
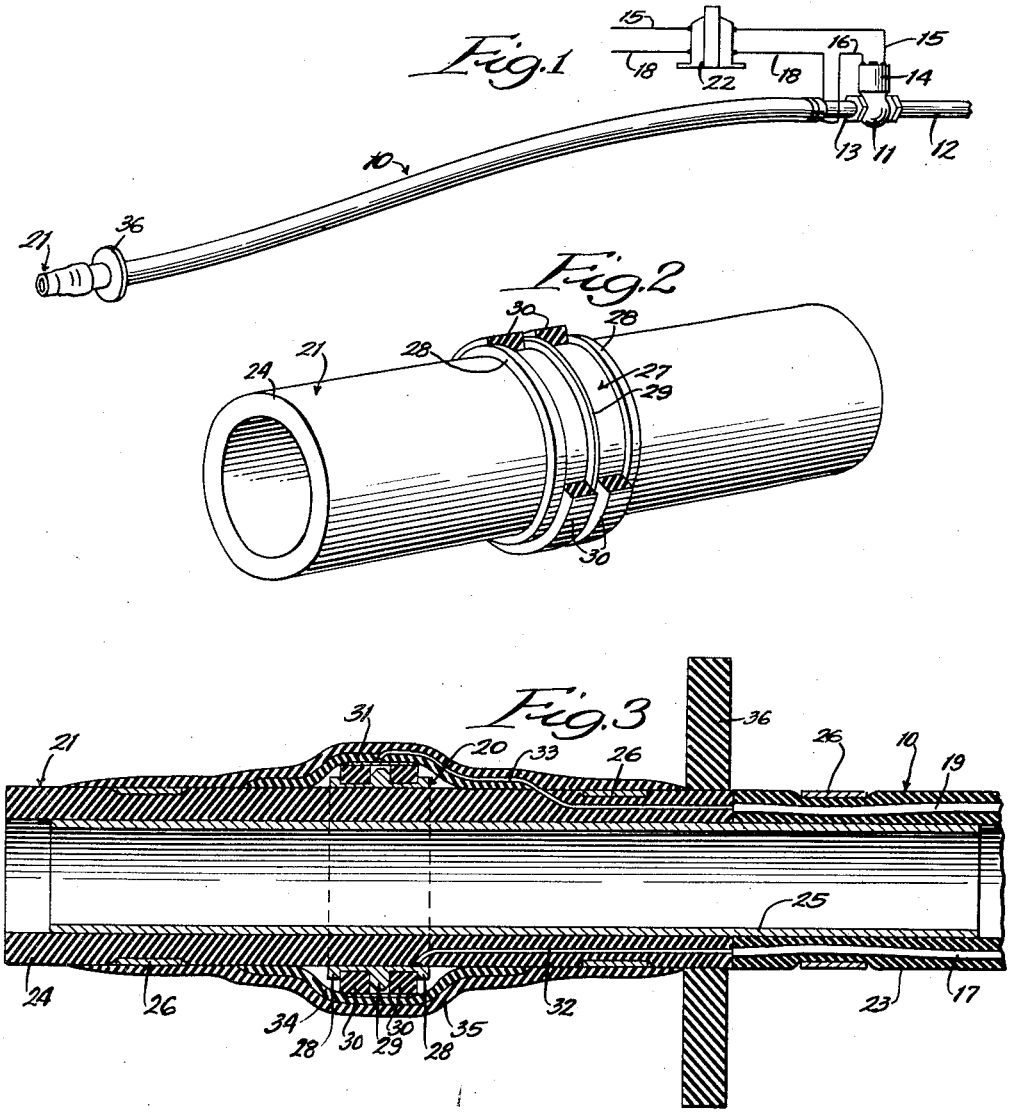
INVENTOR:
David L. Lauer,
BY
Dawson, Tilton & Graham,
ATTORNEYS.

United States Patent Office 2,778,531
Patented Jan. 22, 1957

2,778,531

CONDUIT FLOW CONTROL SYSTEM

David L. Lauer, Chicago, Ill.

Application February 12, 1953, Serial No. 336,587

7 Claims. (Cl. 222—75)

This invention relates to the control of fluid flow through conduits, and more particularly to a valve and system therefor for controlling the flow of liquid through a discharge conduit.

In dairy plants, brewery plants and plants of similar enterprises, products are stored and treated in vats, and customarily these vats are cleaned with water. Similarly, in numerous industries the apparatus employed is cleaned with water. In these cleaning operations water is carried through conduits that are manually manipulated to bring the water discharged to the proper area. Conveniently, and often of necessity, the conduits or discharge hoses are dropped frequently by the workmen during the cleaning operations. It is characteristic that a tremendous wastage of water occurs in the cleaning because the workman cannot easily and conveniently turn off the water discharge when the hose or conduit is dropped. Consequently, the water runs continuously and discharges from the conduit for long periods when it is not being utilized. Mechanical devices have been proposed to automatically turn off the water discharge when the hose or conduit is dropped, but these have been unsatisfactory and in particular do not permit convenient use and manipulation of the hose and do not allow a sufficient flow of liquid therethrough when open.

It is, accordingly, an object of this invention to provide a conduit flow control system that is easily and conveniently actuated to control the flow of fluid through a conduit. Another object of the invention is to provide such a system and wherein the system does not add unwieldy bulk nor restrict the conduit or alter the flow characteristics thereof. Still another object is to provide a flow control system in which the discharge from the conduit is stopped when the conduit is dropped or released by a workman, but yet is simple to actuate by the workman. A further object is that of providing a control system as described having a pressure operated switch for initiating the opening of the conduit for the flow of fluid therethrough upon an easy gripping of the conduit by a workman and when the workman releases his grip upon the hose or conduit the system is shut off. Yet a further object is the provision of a simple and inexpenisve, sturdy and compact switch. Further objects and advantages will appear as the specification continues.

The invention is seen in an illustrative embodiment in the accompanying drawing, in which—

Figure 1 is a largely diagrammatic view showing my control system; Fig. 2 is a perspective view of a hose having my switch mounted thereon and in which the switch covering is removed to expose the switch; and Fig. 3 is a longitudinal sectional view of a nozzle or hose section having my switch mounted thereon.

In the diagrammatic showing of Fig. 1, a flexible conduit or hose 10 adapted to have liquid flow therethrough is connected through a solenoid-controlled valve 11 and an inlet pipe 12 to a source of liquid under pressure. If desired, a coupling 13 may be utilized to connect the hose 10 and valve 11. The valve 11 functions in the usual manner and when in closed position prevents the flow of liquid from the pipe 12 into the conduit 10 and when in open position permits the free flow of liquid therethrough.

To open and close the valve 11 a solenoid 14 is provided that operates in the usual manner and when energized opens the valve 11 and when deenergized permits the valve 11 to close. One side of the solenoid 14 is connected to the power source through a lead 15. The other side of the solenoid is connected through a lead 16 to an electrical conductor 17 that is preferably embedded in the hose 10, as is best seen in Fig. 3. To complete the solenoid circuit a second electrical conductor or lead 18 is connected to the source of electrical power and is also connected to a lead or conductor 19 that is embedded in the conduit 10 and is electrically isolated from the conductor 17 which is also embedded in the conduit 10. The solenoid circuit is actuated by a switch 20 that is mounted in the nozzle 21 connected to the conduit 10 at its discharge end.

If desired, the solenoid 14 may be designed to operate at a voltage reduced from the usual 110-volt line power and, for example, may be a 24-volt solenoid. In such case, a step-down transformer 22 may be interposed in the leads 15 and 18 to provide the required voltage for operating the particular solenoid that is used.

The conduit or hose 10 may have rubber walls 23 or the walls 23 may be of any suitable composition or may be a rubberized fabric, and further the hose may be reinforced with metal wire or loops, if this is found desirable. If the walls 23 are composed of a conductive material, then the leads 17 and 19 should be insulated. Otherwise separate insulation for the leads is not required.

The nozzle 21 may be a length of conduit or hose, such as the conduit 10, wherein the walls 24 provide an electrical insulation. The nozzle 21 may be connected to the discharge end of the flexible conduit 10 by means of a connector 25 that is received within the passage extending through both the conduit 10 and nozzle 21. Hose clamps 26 are provided at spaced points along the nozzle and hose to secure these members tightly upon the connector 25 and in fluid-sealing relation therewith. Any of the usual type of connectors may be employed and if desired the connector 25 may be a length of metal pipe having an external diameter snugly receivable within the hose and nozzle.

The switch 20, as best seen in Figs. 2 and 3, comprises a flat ring 27 that is received upon the wall 24 of the nozzle and is equipped with outer lips or flanges 28 and a central flange or inner contact member 29 positioned centrally between the outer lips or retaining flanges. Mounted between each of the outer flanges 28 and the central flange 29 is an insulating ring or separator 30 that may be rubber or some other insulating material that is at the same time resilient. Each of the rings 30 extends above the outer edges of the flanges 28 and 29 and thereby space from these members an outer ring or contact member 31 that is snugly seated upon the outer surfaces of the rings 30.

Both the outer contact member 31 and the ring 27 and lips thereof are metal such as copper or are made of some other electrical conducting material that is as suitable. I prefer that the inner ring or contact member 27 be brass plated with cadmium. I also prefer that the outer ring or contact member 31 be blue tempered spring steel plated with cadmium. As will be hereinafter described, the outer contact member 31 should be yieldable so that it can be pressed against the central lip or contact 29 against the outwardly biasing action of the resilient separators 30. I have found that .010 blue tempered spring steel plated with cadmium is suitable for this use.

The inner ring 28 is connected with an electrical conductor or lead 32 that is embedded in the wall 24 of the nozzle. The lead 32 is adapted to make electrical contact with the lead 17 when the hose 10 and nozzle 21 are coupled together, as illustrated in Fig. 3. In the same way, a lead 33 embedded in the wall 24 of the nozzle is connected to the outer ring or contact member 31 and makes electrical contact with the lead 19 when the hose and nozzle are coupled. The switch assembly 20 may be enclosed by an inner cover 34 which is preferably of rubber or of other insulating and waterproof material, and the inner cover 34 may be vulcanized in position upon the wall 24 of the nozzle 21. The entire structure may then be enclosed by an outer cover 35 which may be of material such as rubberized cloth. A guard ring 36 mounted near the switch 20 maintains the switch above the level of the floor when the hose is dropped by a workman and thereby prevents the application of pressure to the switch and particularly the contact member 31. If desired, the guard ring 36 may be made of relatively hard rubber.

Operation

As seen best in Fig. 3, the resilient separators 30 normally hold the outer contact member 31 outwardly and in spaced relation with the lip or contact member 29 of the inner ring 27. The solenoid circuit is then open and the valve 11 closed so that fluid cannot flow through the inlet pipe 12 and into the hose 10. However, upon gripping the nozzle 21 in the area about the switch 20, the separators 30 will be compressed and the outer contact member 31 brought into electrical engagement with the central lip or contact member 29 of the inner ring. The circuit will thereby be completed through the solenoid and the valve 11 opened to accommodate the flow of fluid therethrough.

It is apparent that if the workman releases his grip upon the area of the nozzle surrounding the switch 20, as when he drops the hose while in the midst of a vat-cleaning operation, the resilient separators 30 will move the outer contact ring 31 outwardly and away from the contact 29 and the solenoid circuit will be opened. As a result, the valve 11 will close and the discharge of water or other fluid through the conduit 10 will be terminated. The novel system and switch is convenient and easy to operate and automatically terminates the flow of water through the conduit 10 when a workman drops the conduit or otherwise releases his grip upon the nozzle 21 at the switch area. The arrangement is dependable and is simple and inexpensive to install, and its operation will obviate the customary water wastage that is characteristic of water cleaning of vats, etc.

While in the foregoing specification I have set forth a specific embodiment of my invention in detail for the purpose of illustration, it will be apparent to those skilled in the art that changes in the details may readily be made without departing from the spirit of the invention.

I claim:

1. A system for controlling the flow of liquid through a conduit, comprising a flexible fluid flow conduit equipped at one end with a nozzle, a valve connecting the other end of said conduit to a supply of liquid, a solenoid for operating said valve, a switch mounted upon said nozzle, and an electric circuit for energizing said solenoid and having said switch interposed therein, said switch being manually closeable to complete said circuit and being automatically opened upon the release of the manual closing force thereon, and including a ring mounted upon said nozzle and equipped with a raised contact extending about the perimeter of said ring, a movable outer contact member concentrically disposed about said ring, and resilient separators normally spacing said raised contact and outer contact member apart while being yieldable to accommodate engagement between any peripheral portion of said raised contact with an adjacent portion of said concentric contact member when said member is moved inwardly upon the application of a manual force directed thereagainst.

2. The system as set out in claim 1 wherein said switch is enclosed by a pliable cover extending about said nozzle and providing a liquid tight seal thereabout.

3. A nozzle switch adapted for use in a system for controlling the flow of fluid through a flexible conduit, comprising a nozzle adapted to be mounted upon said conduit and having a rigid tubular wall defining a flow passage therethrough, an inner ring adapted to be mounted upon said nozzle wall and being equipped with a raised contact member, an outer annular flexible contact member concentrically disposed about said ring and adjacent said raised contact, and resilient and yieldable separators between said ring and outer contact member and normally uniformly separating said outer contact member and said raised contact, said separators being yieldable to accommodate the pressing of said flexible outer contact member against said raised contact along any peripheral portion thereof while being operable to restore the outer contact member in uniformly spaced relation with said raised contact upon the removal of a pressing force.

4. A manually operated nozzle switch for controlling the flow of fluid through a hose comprising a nozzle having a rigid tubular wall defining a fluid flow passage therethrough, an inner contact band of electrically conductible metal extending perimetrically about a longitudinal portion of said tubular wall and providing an outwardly projecting annular flange about the mid-section thereof, an outer contact band of flexible and electrically conductible metal concentrically disposed about said inner band, and a pair of resilient insulating separator rings disposed between said inner and outer bands along opposite sides of said annular flange, said resilient rings normally maintaining said flexible outer band at a uniformly spaced distance from the outwardly projecting annular flange of said inner band but being yieldable to permit contact between said flange and outer band when portions of said outer band are flexed inwardly, whereby portions of said outer band flex inwardly to engage said flange when said nozzle is gripped by an operator and are urged away from said flange by said resilient rings when said nozzle is released.

5. A manually operated nozzle switch for controlling the flow of fluid through a hose comprising a nozzle having a rigid tubular wall defining a fluid flow passage therethrough, an inner contact band of electrically conductible metal extending perimetrically about said tubular wall and providing an outwardly projecting annular flange about the mid-section thereof, an outer contact band of flexible and electrically conductible metal concentrically disposed about said inner band, and resilient insulator rings disposed between said concentric inner and outer bands and normally maintaining said outer band at a uniformly spaced distance from said annular flange, said resilient rings being yieldable to permit contact between said flange and said outer band when portions of said outer band are flexed inwardly as said nozzle is gripped by an operator.

6. The structure of claim 5 in which said nozzle switch is enclosed by a flexible sheath extending about said nozzle and providing a fluid-tight seal thereabout.

7. A manually operated nozzle switch for controlling the flow of fluid through a conduit comprising a rigid tubular wall providing a fluid flow passage therethrough, an inner ring of electrically conductible material extending about the perimeter of said tubular wall and providing an outwardly projecting annular contact portion, an outer ring of flexible and electrically conductible material concentrically disposed about said inner ring, resilient rings of insulating material carried by said inner ring and normally extending outwardly beyond said contact portion to maintain said concentric rings in uniformly spaced apart relation, said resilient rings being yieldable for accommodating inward flexure of said outer ring and engagement between said outer ring and said contact portion when portions of said outer ring are pressed inwardly.

References Cited in the file of this patent

UNITED STATES PATENTS

| Re. 17,558 | Hawxhurst | July 7, 1930 |
| 1,857,969 | Nelson | May 10, 1932 |
| 2,132,685 | Hampton et al. | Oct. 11, 1938 |
| 2,211,703 | Pleuthner | Aug. 13, 1940 |
| 2,437,969 | Paul | Mar. 16, 1948 |